J. E. TROJAN.
PORTABLE EXTENSIBLE LADDER.
APPLICATION FILED JULY 7, 1917.
1,271,391.
Patented July 2, 1918.
6 SHEETS—SHEET 1.
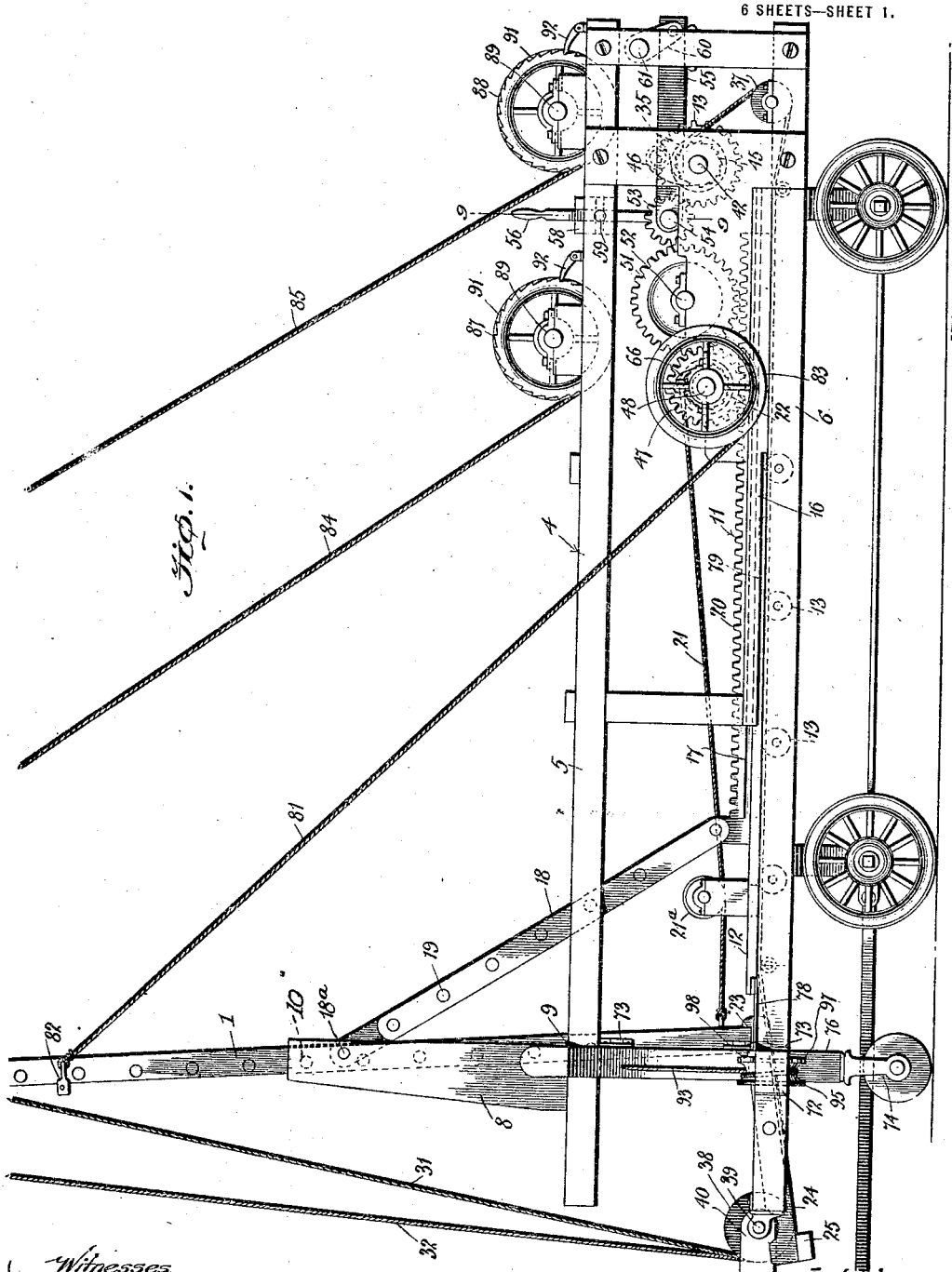

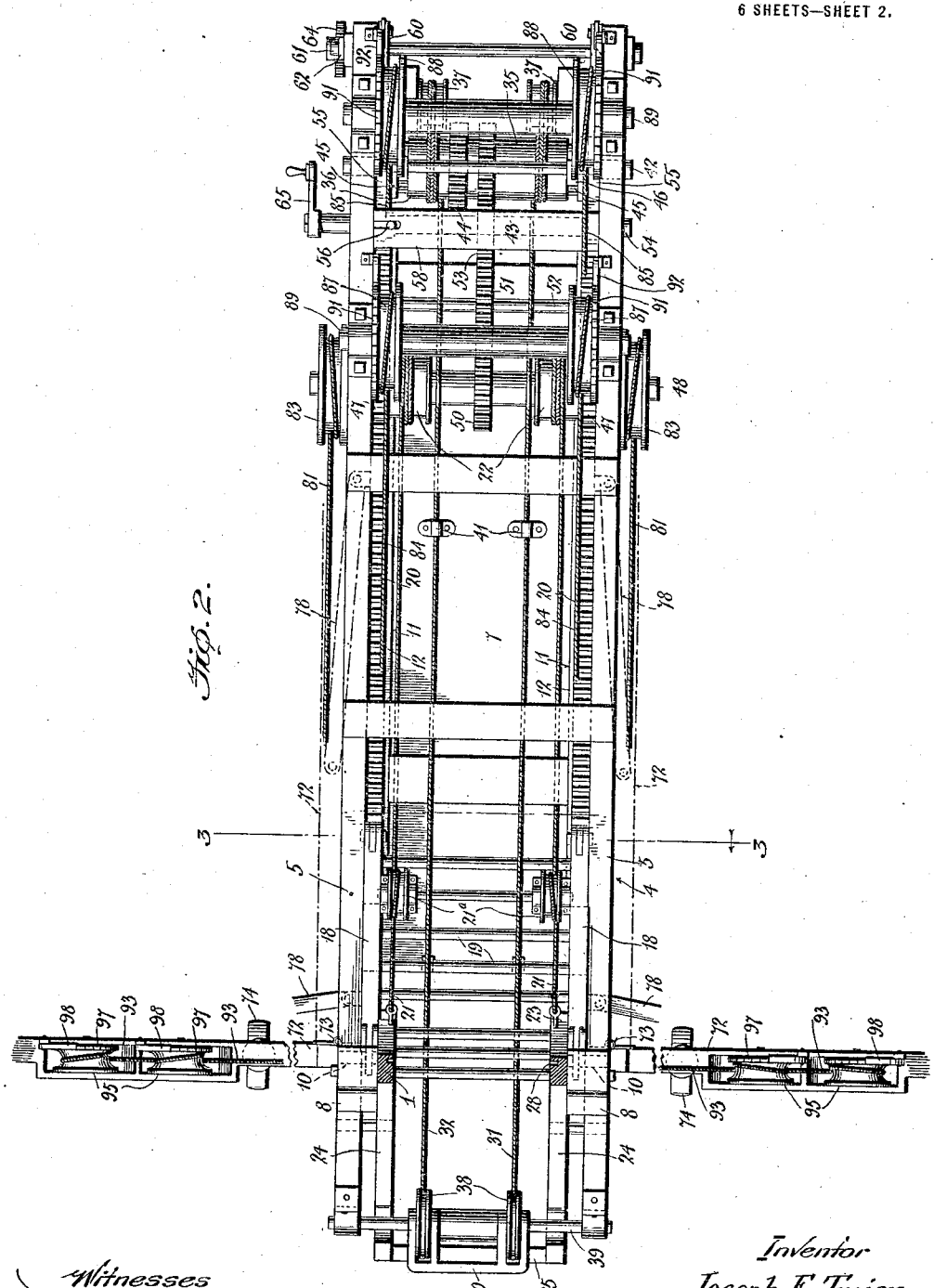

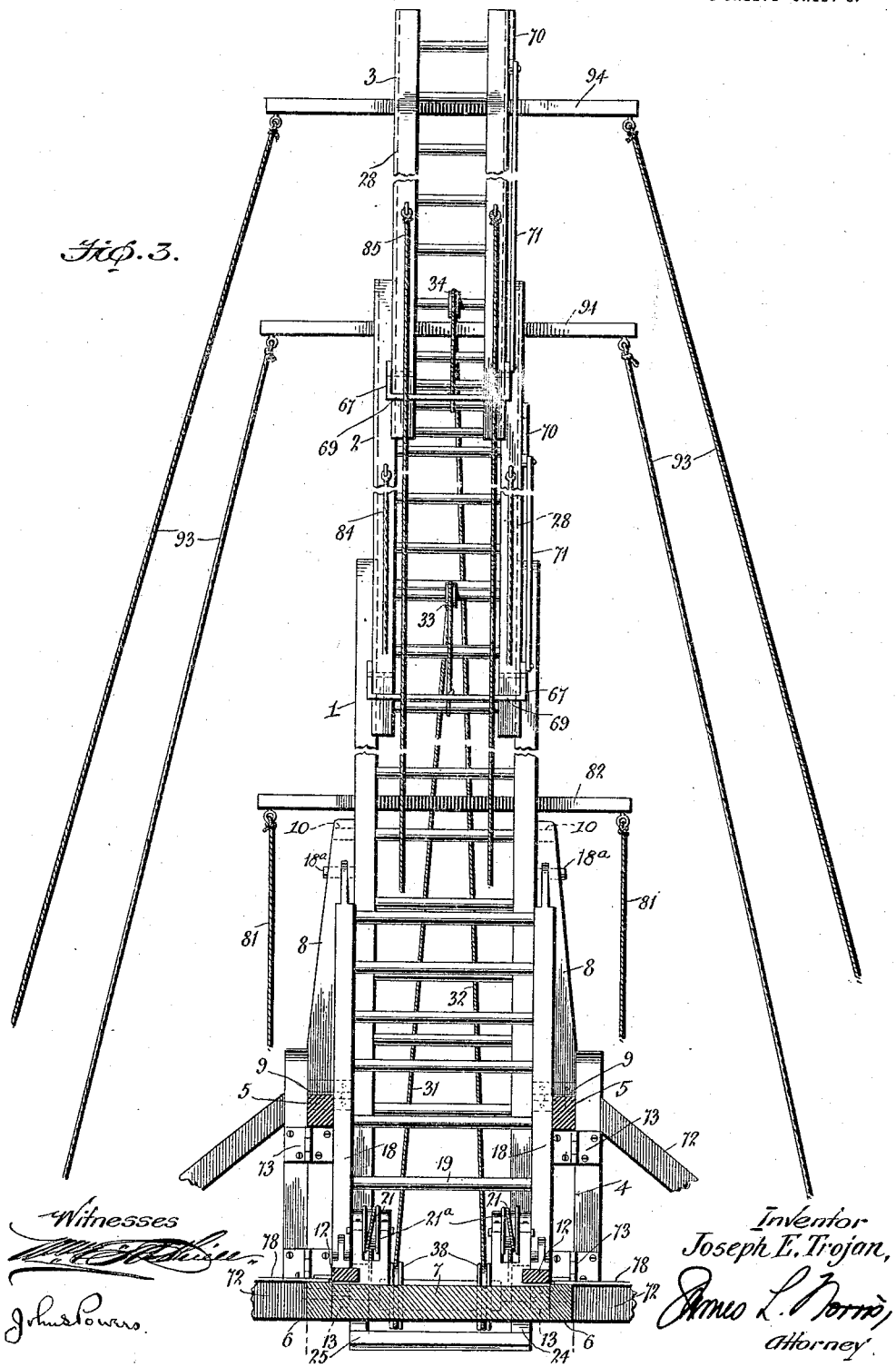

J. E. TROJAN.
PORTABLE EXTENSIBLE LADDER.
APPLICATION FILED JULY 7, 1917.
1,271,391.
Patented July 2, 1918.
6 SHEETS—SHEET 4.
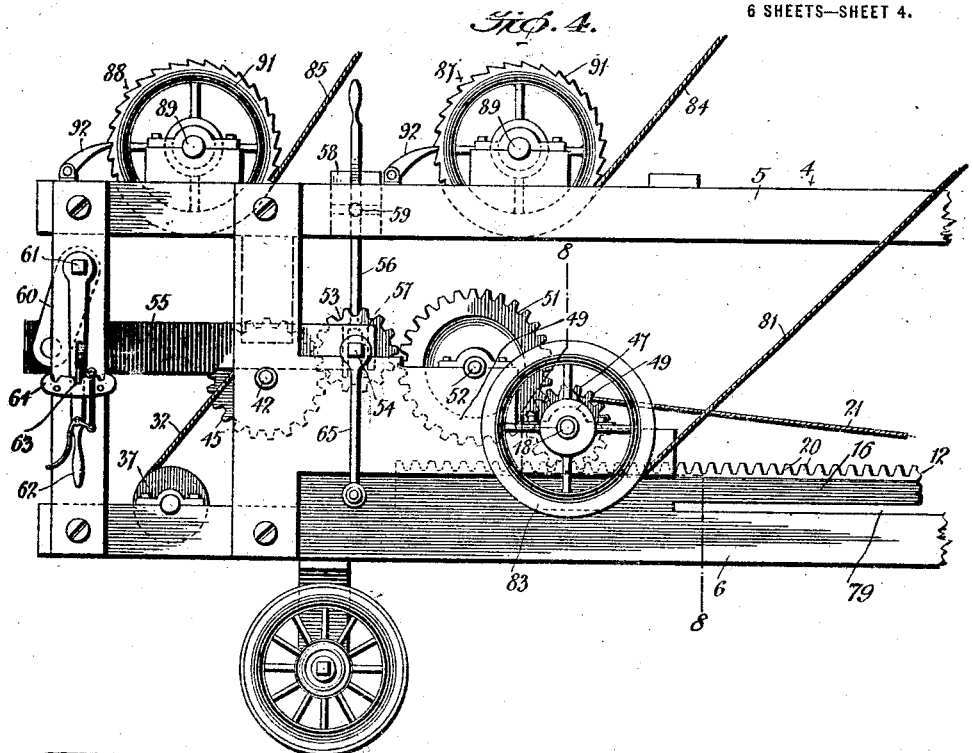
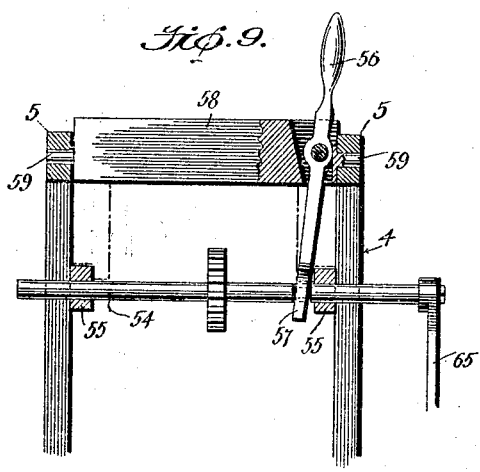
Inventor
Joseph E. Trojan,

J. E. TROJAN.
PORTABLE EXTENSIBLE LADDER.
APPLICATION FILED JULY 7, 1917.

1,271,391.

Patented July 2, 1918.
6 SHEETS—SHEET 5.

Witnesses

Inventor
Joseph E. Trojan,
By
Attorney

J. E. TROJAN.
PORTABLE EXTENSIBLE LADDER.
APPLICATION FILED JULY 7, 1917.

1,271,391.

Patented July 2, 1918.
6 SHEETS—SHEET 6.

Witnesses
Inventor
Joseph E. Trojan,
By
Attorney

UNITED STATES PATENT OFFICE.

JOSEPH E. TROJAN, OF COLUMBUS, TEXAS.

PORTABLE EXTENSIBLE LADDER.

1,271,391.     Specification of Letters Patent.     Patented July 2, 1918.

Application filed July 7, 1917. Serial No. 179,204.

*To all whom it may concern:*

Be it known that I, JOSEPH E. TROJAN, a citizen of the United States, residing at Columbus, in the county of Colorado and State of Texas, have invented new and useful Improvements in Portable Extensible Ladders, of which the following is a specification.

This invention relates to improvements in portable extensible ladders proposing a construction which may be used with advantage for a number of different purposes, prominent among which are its use by firemen or as a fire escape, or as an observation post.

The principal objects of the invention are to provide a readily portable ladder which may be quickly and easily extended to a very considerable height or folded into normal position which may be adjusted to any desired position within its full range of extensibility, and which shall be effectively braced against play, vibration, or tipping.

With the above objects in view the invention consists of certain novel features of structure, combination, and relation which will be set forth in detail as the description proceeds.

An embodiment of the invention is illustrated in the accompanying drawings, wherein:—

Figure 1 is a partial side elevation of a ladder in which the features of the invention are incorporated, certain parts being shown in extended relation.

Fig. 2 is a plan view of the same.

Fig. 3 is a cross sectional view on the line 3—3 of Fig. 2.

Fig. 4 is a partial elevation of the side of the ladder opposite to that shown in Fig. 1 showing the gearing for effecting the extension or folding of the ladder.

Fig. 9 is a detail sectional view on the line 9—9 of Fig. 1.

Similar characters of reference designate corresponding parts throughout the several views.

Figure 5:
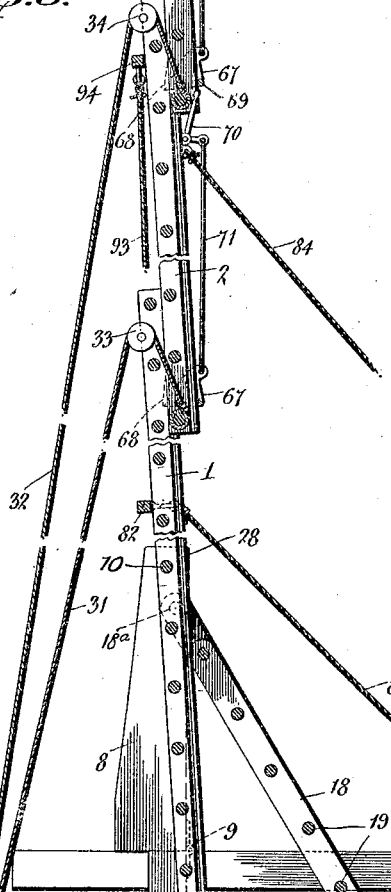
Fig. 5 is a detail longitudinal sectional view showing all of the sections of the ladder in their extended relation.

The ladder proper consists of a number, preferably three, of slidably related sections 1, 2 and 3 adapted, when in folded relation, to lie horizontally. The said sections and their operating appurtenances are mounted on a wheeled truck or supporting frame 4 having upper side rails 5, lower side rails 6, a base or floor 7 supported between the rails 6, and sundry vertical bars connecting the rails 5 and 6 at each side of the truck and transverse bars connecting the rails 5.

The ladder, when elevated, is directly supported by a pair of standards 8, one mounted on each rail 5 and pivoted or hinged to said rail as at 9. The standards 8 normally occupy a lowered position wherein they project rearward from their pivotal axes 9 and are nearly parallel to the rails 5 but in connection with the extension of the ladder sections said standards are movable into an upright position wherein their heel ends rest squarely on the rails 5.

The section 1 is the inner section of the series and is directly supported by the standards 8. Said section 1 in turn supports the intermediate section 2 which in its turn supports the outer section 3. The section 1 is pivoted, as at 10, to the upper ends of the standards 8; and the pivots 10 may with convenience consist of end extensions of one of the ladder rounds.

Normally the sections occupy a horizontal position and are in nested relation. In operation they are, as nested, first raised into upright position and thereafter all but the lowermost section are projected vertically, each vertically movable section having a movement relatively to its neighbor next below through a distance substantially equal to its own length and also being carried upward or downward with said neighboring section when the latter is operated.

Figure 8:
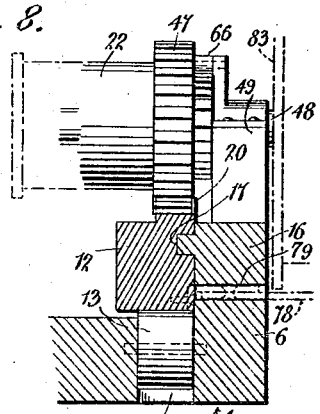
Fig. 8 is a detail sectional view on the line 8—8 of Fig. 4.
Figure 10:
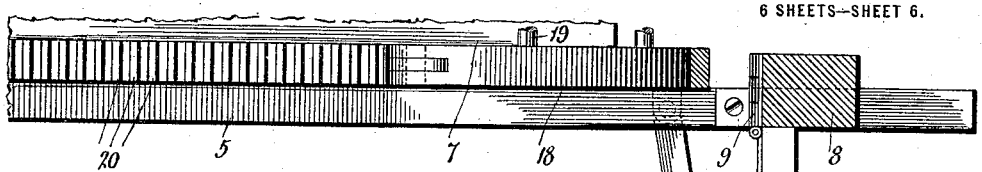
Fig. 10 is a plan view showing details of the operative mechanism for the lateral brace arms.

For the purpose of moving the sections, when nested, from a horizontal to a vertical position or vice versa, a frame 11 is mounted for lengthwise sliding movement on the floor 7 and is movable in either direction from end to end of said floor. The frame 11 includes side bars 12 which operate on supporting rollers 13 located at the sides of the floor 7 in recesses 15. For the purpose of guiding the frame 11 bars 16 are mounted on or formed as parts of the rails 6 and tongue and groove connections 17 (Fig. 8) are provided between said bars and the bars 12. The frame 11 is connected to the standards 8 by links 18 which are pivoted to said standards as at 18ª, (preferably below the pivots 10) and to the front ends of the bars 12 and are preferably connected together by ladder rounds 19 to facilitate the mounting of the ladder from a position in the rear thereof. The side bars 12 are formed with rack teeth 20 for coöperation with gear elements to be hereafter described by which the frame 11 is moved in either direction.

The side bars of the inner section 1 are continued for some distance beyond the standards 8 and are connected to cables 21 which are wound upon drums 22 in connection with the forward movement of the frame 11. As the ladder comes into its vertical position the lower ends of the side bars of the section 1 automatically engage in notches 23 of latch arms 24. The latch arms 24 are pivoted to forward extensions of the rails 6 and in order that they may operate in unison are connected by a transverse bar 25 which is preferably located at their front ends and also serves as a weight to insure the normal elevation of their rear ends, pins 27 secured in vertical bars at the front end of the truck 4 being provided to limit the upward movement of the arms 24. When the ladders are to be returned to their horizontal position, the operator first manipulates the arms 24 to release the lower ends of the side bars of the section 1, whereupon the ladder is free to move back into its normal position.

Figure 7:
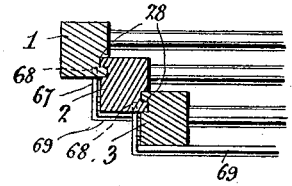
Fig. 7 is a detail cross sectional view of the ladder sections in their nested relation.

The sections 1, 2 and 3 are slidably related and may be fitted to one another in any suitable manner. As shown tongue and groove connections 28 (Fig. 7) are provided between the adjacent side bars of the sections. After the ladder has been moved into a vertical position its extension is completed by sliding the sections outward relative to one another. The section 3 is first raised, the section 2 remaining stationary after which the section 2, carrying with it the section 3, is similarly raised, the section 1 remaining stationary throughout the operation of the sections 2 and 3.

The slidable upward movements of the sections 2 and 3 are effected by cables 31 and 32 respectively and the downward movements of said sections are under the control of said cables whose length is of course selected with regard to the maximum distance through which the sections are vertically movable. The cable 31 is secured to the lower round of the section 2 and is trained over a sheave 33 at the upper end of the section 1. In like manner the cable 32 is secured to the lower round of the section 3 and is trained over a sheave 34 at the upper end of the section 2.

For the operation and control of the cables 31 and 32 winding drums 35 and 36, preferably located near the rear end of the truck 4, are provided. The cables 31 and 32 pass rearward from the respective drums 35 and 36 and are trained over guide sheaves 37 supported at the rear end of the truck whence they are led forward and trained over guide sheaves 38 supported at the front end of the truck. From the sheaves 38 said cables are led upward and trained over the sheaves 33 and 34 above mentioned. The sheaves 38 are preferably loosely mounted on a fixed transverse rod 39 and are arranged within a cable guide 40 supported by said rod. Suitable guides or keepers 41 for the cables 31 and 32 may, as shown, be arranged on the floor 7.

The drums 35 and 36 are loosely mounted on a transverse supporting rod 42 and are provided at their adjacent ends with pinions 43 and 44 respectively and at their remote ends with ratchet wheels 45 for engagement by pawls 46, (Figs. 1 and 2).

The gearing for the operation of the frame 11 includes pinions 47 for engagement with the rack teeth 20 of the bars 12, the pinions 47 being fast on a transverse shaft 48 journaled in bearing brackets 49 secured to stationary parts of the machine, conveniently the bars 16 which guide the frame 11. The shaft 48 is provided with an intermediate pinion 50 which is in gear with a pinion 51 mounted on a transverse shaft 52 located in the rear of the shaft 48 and also journaled in the bearing brackets 49.

The winding drums 22 above referred to are fast on the shaft 48. In this way the rotation of said shaft to advance the frame 11 will also be effective to operate said drums in winding thereon the cables 21 and causing the ladder to follow the standards 8 into an upright position. The cables 21 are preferably coiled once about idler sheaves 21ª whose supports are stationarily located on the truck 4.

The pinions 43, 44 and 51 are each operated by a movably mounted main or driving pinion 53. The pinion 53 is mounted on a transverse main shaft 54 which is rotatable and also slidable in the direction of its length, i. e. transversely, in horizontal supporting slides 55 which are disposed and movable longitudinally of the truck.

In order to move the pinion 53 transversely a transversely movable lever 56 is provided, said lever at its lower end having a yoke 57 which engages in an annular groove in the shaft 54. The lever 56 is pivoted to a transverse supporting bar 58.

The slides 55 which support the shaft 54 are supported by stationary vertical bars at the sides of the truck 4 and are movable lengthwise of said truck to shift the pinion 53 in a longitudinal direction. In order that the lever 56 may be adapted to such movement of the pinion 53 the bar 58 is mounted to rock about its central longitudinal axis and is, therefore, provided with end trunnions 59 which are journaled in bearings formed with or secured to stationary parts at the sides of the frame 4.

In order to effect the shifting of the pinion 53 in a direction longitudinal of the truck the rear ends of the slides 55 are loosely pivoted to operating arms 60 depending from a transverse rock shaft 61 journaled in stationary vertical bars at the sides of the frame 4. The shaft 61 has a projecting end upon which is mounted an operating lever 62 provided with a conventional locking pawl 63 for coöperation with a segment 64 notched to provide for two operative extreme positions of the slides 55 and an intermediate inoperative or neutral position of said slides. In the retracted position of the slides 55 the pinion 53 may be operated to engage either of the pinions 43 or 44 and in the advanced position of said slides the pinion 53 may be operated to engage the pinion 51.

The shaft 54 has a projecting end which is fitted to receive an operating crank 65 by which said shaft may be rotated in either direction.

In the operation of the ladder the frame 11 is advanced and the cables 21 wound upon the drums 22 to move the nested ladder sections forwardly from a horizontal to an upright position. For such operations of the frame 11 and cables 21 the pinion 53 is engaged with the pinion 51. Thereafter the sections 2 and 3 are projected vertically. For these operations the pinion 53 is shifted rearwardly and is then positioned to engage and operate the pinion 44 which, through the drum 36 and cable 32, effects the vertical movement of the ladder section 3. The pinion 53 is then shifted laterally to engage and operate the pinion 43, which, through the drum 35 and cable 31, effects the vertical movement of the ladder section 2. In like manner the pinion 53 is employed to control the nesting of the ladder sections and to effect their movement, when nested, into horizontal position. In restoring the ladder sections to their normal position the pinion 53 is first engaged with the pinion 44 to control the descent of the section 3, then with the pinion 43 to control the descent of the section 2, and then with the pinion 51 to effect the rearward movement of the frame 11 and the consequent downward pivotal movement of the nested ladder sections into their normal horizontal position.

In order to prevent any accidental falling movement of the ladder sections when, as nested, they are being moved from their normal horizontal to their upright positions, the pinions 47 which engage the rack teeth 20 are provided with ratchets for coöperation with pawls 66 (Fig. 1), these pawls being moved into disengaged position to permit the rearward movement of the frame 11 and the unwinding of the cables 21 from the drums 22 for the purpose of restoring the nested ladder sections to their normal horizontal positions. In like manner the pawls 46 coöperate with the ratchet wheels 45 to prevent any accidental falling movement of the ladder sections 2 and 3 when they are being projected vertically, and are moved into disengaged position to permit the descent of said ladder sections.

It is obvious that by virtue of the pawls 66 the ladder may be set at any inclination between its extreme horizontal and vertical positions and that by virtue of the pawls 46 the ladder may be projected to any desired height. The pawls 66 also render the cables 21 effective to stay or brace the lower end of the ladder, the cables in this function supplementing the latch arms 24.

The section 2 when raised carries with it the section 3 and during this further upward movement of the section 3 its cable 32 pays out from the drum 36 and hence rotates said drum in a direction reverse to that of its rotation by the pinion 53 to effect the raising of the section 3 relatively to the section 2; and to permit such reverse rotation of the drum 36 the pawl 46 which controls the ratchet wheel 45 associated with said drum must be disengaged after the ladder section 3 has completed its upward movement relatively to the section 2.

The sections 2 and 3 when fully projected are positively held against downward movement by latch fingers 67 which engage in recesses 68 (Fig. 5) formed in the side bars of the respective sections 1 and 2. The latch fingers 67 are pivoted to the lower ends of the side bars of the sections 2 and 3 and are preferably provided in pairs, the latch fingers of each pair being connected by a transverse bar 69 whereby they may operate in unison. Each of the sections 2 and 3 carries means for operating the latch fingers to release the section from its companion section 1 or 2 as the case may be. Such means preferably consists of a bell-crank lever 70 pivoted near the upper end of the section by which it is carried and connected by a link 71 to one of the latch fingers of said section. The fully projected relation of the ladder sections is shown in Fig. 5. When it is desired to nest said sections the lever 70 of the section 3 is operated to disengage the fingers 67 of the section 3 from the recesses 68 of the section 2 to thereby permit the downward movement of the section 3, relative to the section 2 and when such downward movement has been completed the section 2 is similarly released from the section 1 and permitted to descend, carrying with it the section 3.

The descent of the sections 2 and 3 takes place by gravity but is under the control of an operator, stationed on the ground, through the intermediary of the gearing which operates the cables 31 and 32.

In the foregoing description an operation has been set forth according to which, in the projection and descent of the ladder sections the section 3 is first moved relatively to the section 2 and the latter, carrying with it the section 3, is thereafter moved relatively to the section 1. It will be understood, however, that if desired, both in the projection and nesting of the ladder sections the section 2 may be first operated, carrying with it the section 3, and that the latter may thereafter be moved relatively to the section 2.

For the purpose of steadying the truck 4 when the ladder sections are projected said truck is provided with relatively long wings 72 which are hinged or pivoted at their front ends, as at 73, to the front end of the truck and are movable horizontally. In operation the wings 72 are moved from their normal positions wherein they are parallel to the truck to operative positions wherein they project laterally from the truck and at right angles thereto. In order that the wings may be supported from the ground, each wing is provided near its outer end, with a caster 74. The casters 74 are so mounted that they may adapt themselves to irregularities in the ground, and for this purpose their journal stems 75 are mounted for vertical play, within suitable limits, in sockets 76 and are urged downward by springs 77.

The folding or projection of the wings 72 is effected automatically in connection with the pivotal movements of the nested ladder sections. Accordingly each side bar 12 of the frame 11 is connected to the adjacent wing by a link 78; and when the wings are folded, the links 78 lie above and athwart the rails 6, the bars 16 being recessed as at 79 to accommodate said links.

Figure 11:
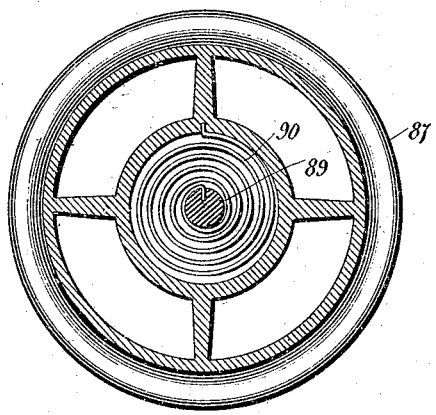
Fig. 11 is a detail sectional view of a spring held pulley.
Figure 12:
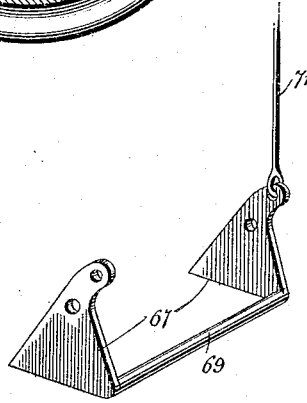
Fig. 12 is a perspective view of a latch element employed when the sections of the ladder are fully extended.

The ladder sections when in their extreme forward positions and projected, will, as shown in Fig. 5, be inclined forwardly to a slight extent and means are provided to steady or brace said sections in this relation. For the section 1 the bracing means comprises guy cables 81 connected to a cross strip 82 arranged at a suitable elevation on said section and also connected to winding drums 83 fast on the shaft 48, said cables paying out when said shaft is operated to project the frame 11 and being wound on said drums when said shaft is operated to retract said frame. For the sections 2 and 3 the bracing means comprises guy cables 84 and 85 respectively connected to said sections at suitable elevations and to respective winding drums 87 and 88. The winding drums are mounted in pairs on transverse rods or shafts 89 and are operated by springs 90 (Fig. 11) to wind the cables thereon. As shown the shafts 89 are stationary and the springs 90 are housed within the drums, their ends being connected to said drums and said shafts. Although the springs 90 keep the cables under tension which becomes stronger as the ladder sections are projected and therefore resist any forward tipping of the ladder sections it is preferred to provide for the positive maintenance of the tension of the cables. For this purpose the drums are provided with ratchet wheels 91 (Figs. 1 and 2) for coöperation with pawls 92. The pawls 92 are disengaged while the ladder sections are being projected but when said sections are fully projected they are engaged with the ratchet wheels 91 to prevent the cables from yielding consequent to any forward pull of the ladder sections. When the ladder sections are nested the drums 87 and 88, by virtue of the springs 90, automatically wind or take up the cables 84 and 85.

Figure 6:
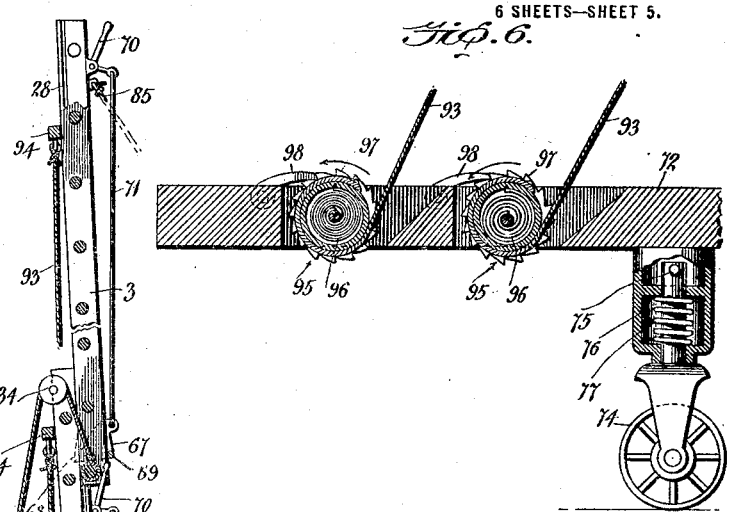
Fig. 6 is a detail sectional view of one of the lateral brace arms.

It is also preferred to provide means for bracing the sections 2 and 3 laterally. This means comprises guy cables 93 which are connected to cross strips 94 arranged at suitable elevations on said sections and to winding drums 95 (Fig. 6) carried by the wings 72 and arranged near the outer ends of said wings. The drums 95 are operated by springs 96 to wind the cables and are provided with ratchet wheels 97 for coöperation with pawls 98. The pawls 98 are disengaged while the wings are moved into their operative position and during the projection of the ladder sections but when said sections are fully projected said pawls are engaged to positively prevent the cables from paying out in consequence of any tendency of the ladder to lean sidewise.

Having fully described my invention, I claim:—

1. In a portable ladder combination, a wheeled truck, a ladder mounted on said truck for movement between horizontal and upright positions, wings mounted at the sides of said truck, said wings being normally parallel to said truck and movable to positions wherein they project laterally from said truck, and means for operating said ladder and said wings in correlation whereby the wings are moved from their normal positions when the ladder is raised and are restored to their normal positions when the ladder is lowered.

2. In a portable ladder combination, a wheeled truck, a ladder mounted on said truck for movement between horizontal and upright positions, wings mounted at the sides of said truck, said wings being normally parallel to said truck and movable to positions wherein they project laterally from said truck, a frame slidable lengthwise of said truck, link connections for operating said ladder from said frame and other link connections for operating said wings from said frame whereby said wings are moved from their normal positions when the ladder is raised and are restored to their normal positions when the ladder is lowered.

3. In a portable ladder combination, a wheeled truck, a ladder mounted on said truck for movement between horizontal and upright positions, said ladder consisting of slidably related sections, gearing for moving said ladder between its horizontal and upright positions, transversely adjacent gearings having a location in the longitudinal direction of the truck distant from said first named gearing for operating the slidably movable sections, a main gear located intermediate said ladder moving gearing and section operating gearings and mounted for movement longitudinally and transversely of the truck, and means for moving said main gear to effect its selective engagement with elements of each of said gearings to operate the same.

4. In a portable ladder combination, a wheeled truck, a ladder mounted on said truck for pivotal movement between horizontal and upright positions, a sliding horizontal frame movable lengthwise of said truck, links connected to said frame for moving said ladder pivotally between its horizontal and vertical positions, gearing for operating said frame including a transverse shaft, winding drums mounted on said shaft, and cables for bracing said ladder and connected to said winding drums from which they pay out as the ladder is raised to a vertical position.

5. In a portable ladder combination, a wheeled truck, a ladder mounted at the front thereof for pivotal movement between horizontal and upright positions and consisting of a plurality of slidably related sections, means for extending the ladder comprising a lifting cable connected to the lower end of each slidably movable section and guided over the upper end of the section next below, a winding drum for each lifting cable located near the rear end of the truck, a pawl and ratchet coacting with each winding drum to prevent the descent of the ladder sections, guide sheaves for the lifting cables located at the front end of the truck and in advance of said ladder, and gearing for selectively operating said winding drums, and gearing located intermediate said winding drums and the ladder for effecting pivotal movement of the ladder in either direction.

In testimony whereof I have hereunto set my hand in presence of two subscribing witnesses.

JOSEPH E. TROJAN.

Witnesses:
CHAS. S. HYER,
JOHN S. POWERS.

Copies of this patent may be obtained for five cents each, by addressing the "Commissioner of Patents, Washington, D. C."